US012080237B2

(12) United States Patent
Irobe

(10) Patent No.: US 12,080,237 B2
(45) Date of Patent: Sep. 3, 2024

(54) DISPLAY SYSTEM

(71) Applicant: SEIKO EPSON CORPORATION, Tokyo (JP)

(72) Inventor: Jun Irobe, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/190,978

(22) Filed: Mar. 28, 2023

(65) Prior Publication Data

US 2023/0326407 A1 Oct. 12, 2023

(30) Foreign Application Priority Data

Mar. 29, 2022 (JP) ................................ 2022-053868

(51) Int. Cl.
*G09G 3/3233* (2016.01)

(52) U.S. Cl.
CPC ... *G09G 3/3233* (2013.01); *G09G 2300/0426* (2013.01); *G09G 2300/0452* (2013.01); *G09G 2300/0809* (2013.01); *G09G 2320/0233* (2013.01); *G09G 2320/0242* (2013.01)

(58) Field of Classification Search
CPC ......... G09G 3/3233; G09G 2300/0452; G09G 2300/0426; G09G 2300/0809; G09G 2320/0233; G09G 2320/0242; G09G 2320/0666
See application file for complete search history.

(56) References Cited

U.S. PATENT DOCUMENTS 6,862,012 B1 * 3/2005 Funakoshi ........... G09G 3/2092 345/88
7,193,746 B2 * 3/2007 Kanai ...................... H04N 9/67 358/1.9
7,663,673 B2 * 2/2010 Kurumisawa .......... H04N 21/84 348/222.1
7,974,469 B2 * 7/2011 Kurumisawa ............ H04N 1/62 382/167
8,044,968 B2 * 10/2011 Kanai .................. H04N 9/3182 345/589
9,024,937 B2 * 5/2015 Hayashi ............... H04N 1/6033 345/89
10,339,874 B2 * 7/2019 Won ..................... G09G 3/3275
(Continued)

FOREIGN PATENT DOCUMENTS

JP 2001119717 4/2001
JP 2008292680 12/2008
(Continued)

*Primary Examiner* — Benyam Ketema
(74) *Attorney, Agent, or Firm* — JCIPRNET

(57) ABSTRACT

A display system includes a display unit that displays pixels with a red sub-pixel, a green sub-pixel, and a blue sub-pixel, and a correction circuit that sets a color temperature for white luminescence. When the pixels perform display in a first tone that is the same tone with the red sub-pixel, green sub-pixel, and blue sub-pixel, the correction circuit sets a first color temperature as a white point. When the pixels perform display in a second tone that is lower than the first tone and that is the same tone with the red sub-pixel, green sub-pixel, and blue sub-pixel, the correction circuit sets a second color temperature different from the first color temperature as the white point.

7 Claims, 11 Drawing Sheets

(56) References Cited

U.S. PATENT DOCUMENTS

| | | | | |
|---|---|---|---|---|
| 11,600,226 | B2 * | 3/2023 | Hwang | G09G 3/3208 |
| 2007/0085911 | A1 * | 4/2007 | Nakamura | H04N 23/88 348/223.1 |
| 2009/0256916 | A1 * | 10/2009 | Tanaka | G09G 5/02 345/589 |
| 2011/0032275 | A1 * | 2/2011 | Marcu | G09G 3/2003 345/690 |
| 2011/0148910 | A1 * | 6/2011 | Botzas | G09G 5/02 345/694 |
| 2011/0149166 | A1 * | 6/2011 | Botzas | H04N 9/69 348/E9.037 |
| 2012/0054664 | A1 * | 3/2012 | Dougall | H04N 21/6582 715/772 |
| 2012/0105502 | A1 * | 5/2012 | Yokoyama | G09G 3/20 345/690 |
| 2012/0162239 | A1 * | 6/2012 | Marcu | G09G 5/06 345/589 |
| 2015/0070377 | A1 * | 3/2015 | Matsui | H04N 9/73 345/589 |
| 2015/0109460 | A1 * | 4/2015 | Yonishi | H04N 9/67 348/182 |
| 2018/0151127 | A1 * | 5/2018 | Won | G09G 3/3275 |
| 2020/0388224 | A1 * | 12/2020 | Holsteen | G09G 3/20 |
| 2022/0036814 | A1 * | 2/2022 | Hwang | G09G 3/3233 |
| 2022/0208092 | A1 * | 6/2022 | Gao | H10K 59/353 |
| 2023/0326407 | A1 * | 10/2023 | Irobe | G09G 3/3233 345/694 |

FOREIGN PATENT DOCUMENTS

| | | |
|---|---|---|
| JP | 2012093590 | 5/2012 |
| JP | 2015056800 | 3/2015 |

* cited by examiner

| | RANK 1 | | |
|---|---|---|---|
| TONE | COLOR TEMPERATURE | CIE-x | CIE-y |
| 255 | 6800K | 0.309 | 0.319 |
| 127 | 6800K | 0.309 | 0.319 |
| 63 | 6300K | 0.317 | 0.327 |
| 47 | 5000K | 0.345 | 0.352 |
| 31 | 4000K | 0.380 | 0.377 |

| | RANK 2 | | |
|---|---|---|---|
| TONE | COLOR TEMPERATURE | CIE-x | CIE-y |
| 255 | 6800K | 0.309 | 0.319 |
| 127 | 6800K | 0.309 | 0.319 |
| 63 | 6500K | 0.314 | 0.324 |
| 47 | 6300K | 0.317 | 0.327 |
| 31 | 5000K | 0.345 | 0.352 |

| | RANK 3 | | |
|---|---|---|---|
| TONE | COLOR TEMPERATURE | CIE-x | CIE-y |
| 255 | 6800K | 0.309 | 0.319 |
| 127 | 6800K | 0.309 | 0.319 |
| 63 | 6800K | 0.309 | 0.319 |
| 47 | 6800K | 0.309 | 0.319 |
| 31 | 6800K | 0.309 | 0.319 |

FIG. 9

<RANK 1>

| TONE | COLOR TEMPERATURE | SETTING CIE-x | SETTING CIE-y | Dout R | Dout G | Dout B |
|---|---|---|---|---|---|---|
| 255 | 6800K | 0.309 | 0.319 | • • • | • • • | • • • |
| ⋮ | | | | ※ | ※ | ※ |
| 127 | 6800K | 0.309 | 0.319 | • • • | • • • | • • • |
| ⋮ | | | | ※ | ※ | ※ |
| 63 | 6800K | 0.317 | 0.327 | • • • | • • • | • • • |
| ⋮ | | | | ※ | ※ | ※ |
| 47 | 5000K | 0.345 | 0.352 | • • • | • • • | • • • |
| ⋮ | ※ | | | ※ | ※ | ※ |
| 31 | 4000K | 0.380 | 0.377 | • • • | • • • | • • • |
| ⋮ | | | | ※ | ※ | ※ |
| 0 | | | | • • • | • • • | • • • |

LUT (Dout R, G, B columns)

※ INTERPOLATION CALCULATION (10 BITS)

• • • CALCULATION (10 BITS)

| | RANK 1 | | |
|---|---|---|---|
| TONE | COLOR TEMPERATURE | CIE-x | CIE-y |
| 255 | 6800K | 0.309 | 0.319 |
| 127 | 6800K | 0.309 | 0.319 |
| 63 | 8000K | 0.295 | 0.305 |
| 47 | 12000K | 0.272 | 0.278 |
| 31 | 15000K | 0.264 | 0.267 |

| | RANK 2 | | |
|---|---|---|---|
| TONE | COLOR TEMPERATURE | CIE-x | CIE-y |
| 255 | 6800K | 0.309 | 0.319 |
| 127 | 6800K | 0.309 | 0.319 |
| 63 | 7500K | 0.300 | 0.310 |
| 47 | 8500K | 0.291 | 0.300 |
| 31 | 10000K | 0.281 | 0.288 |

| | RANK 3 | | |
|---|---|---|---|
| TONE | COLOR TEMPERATURE | CIE-x | CIE-y |
| 255 | 6800K | 0.309 | 0.319 |
| 127 | 6800K | 0.309 | 0.319 |
| 63 | 6800K | 0.309 | 0.319 |
| 47 | 6800K | 0.309 | 0.319 |
| 31 | 6800K | 0.309 | 0.319 |

FIG. 15

DISPLAY SYSTEM

The present application is based on, and claims priority from JP Application Serial Number 2022-053868, filed Mar. 29, 2022, the disclosure of which is hereby incorporated by reference herein in its entirety.

BACKGROUND

1. Technical Field

The present disclosure relates to a display system.

2. Related Art

In recent years, various electro-optical devices using electro-optical elements such as OLED (Organic Light Emitting Diode) are proposed. In such electro-optical devices, individual differences may possibly occur due to differences in manufacturing conditions. The individual difference is a phenomenon in which displayed colors differ even when a plurality of electro-optical devices is driven under the same conditions, for example. More specifically, it is a phenomenon in which when a certain tone (brightness) is specified for a certain electro-optical device using input tone data, the luminance of this electro-optical device and the luminance of another electro-optical device, for which the same tone is specified, are perceived as different.

Therefore, it is conceivable that the input tone data is converted into output tone data to obtain the desired luminance, and the electro-optical elements are driven based on the output tone data so that the luminance is perceived as the same even with individual differences (see, for example, JP-A-2008-292680). In addition, the above-described JP-A-2008-292680 also discloses that for example, white light is displayed at bright tone for each of red, green, and blue, the color temperature of the white light is measured, and the output tone is determined based on the measured color temperature and adjusted so that the color temperature does not vary across all tones.

The electro-optical elements include some elements where the white point for which a low tone is specified, i.e., darkening is specified is shifted from the white point for which a bright tone is specified, due to leakage current and the like.

If such an electro-optical element is used, the configuration of determining the output tone based on the color temperature of the white light measured in a bright tone may cause problem in which when a dark tone is specified, the white point is shifted and the color shift occurs when viewed as a display device.

SUMMARY

To solve the above-mentioned problems, a display system according to an aspect of the present disclosure includes a display unit including a plurality of sub-pixels and configured to display a color in a tone set for each of the plurality of sub-pixels, and a correction circuit configured to correct the color displayed by the plurality of sub-pixels in accordance with the tone set for each of the plurality of sub-pixels. When chromaticity of the color is equal to or greater than a predetermined threshold value, the correction circuit corrects the color with a first color temperature as a white point, the first color temperature being a color temperature of a case where all of the plurality of sub-pixels display white in a predetermined first tone, and when the chromaticity of the color is smaller than the predetermined threshold value, the correction circuit corrects the color with a second color temperature different from the first color temperature as the white point, the second color temperature being a color temperature of a case where all of the plurality of sub-pixels display white in a predetermined second tone, the predetermined second tone being lower than the predetermined first tone.

BRIEF DESCRIPTION OF THE DRAWINGS

FIG. 9 is a diagram illustrating a relationship between a specific tone, a color temperature, and a CIE chromaticity of each rank.

FIG. 15 is a diagram illustrating a relationship between a specific tone, a color temperature, and a CIE chromaticity of each rank in an electro-optical device applied to a display system according to a second embodiment.

DESCRIPTION OF EXEMPLARY EMBODIMENTS

Hereinafter, embodiments of the present disclosure will be described with reference to the drawings. In each of the drawings, dimensions and scale of each part are appropriately different from the actual dimensions and scale. Moreover, the embodiments described below are suitable specific examples, and various technically preferable limitations are applied, but the scope of the disclosure is not limited to these modes unless they are specifically described in the following description as limiting the disclosure.

Figure 1:
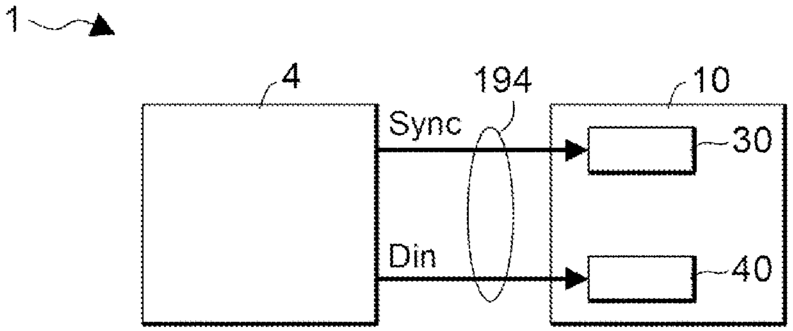
FIG. 1 is a diagram illustrating a configuration of a display system according to a first embodiment.
Figure 2:
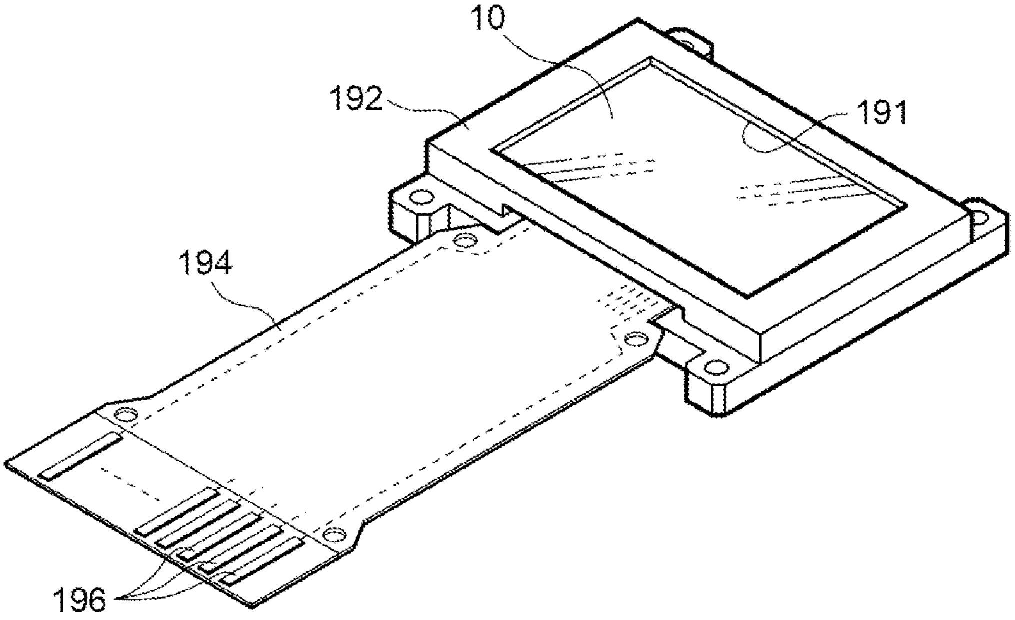
FIG. 2 is a perspective view illustrating an electro-optical device applied to the display system.
Figure 3:
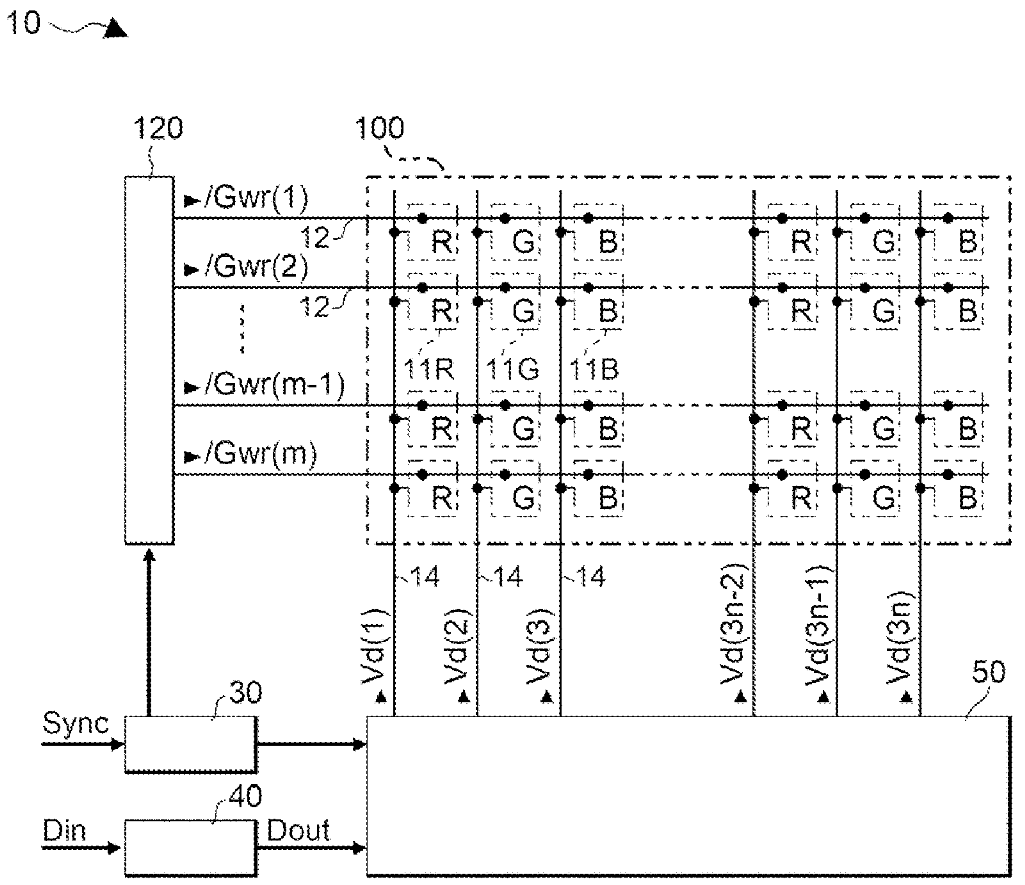
FIG. 3 is a block diagram illustrating an electrical configuration of the electro-optical device.

FIG. 1 is a diagram illustrating a configuration of a display system 1 according to a first embodiment, FIG. 2 is a perspective view illustrating an external appearance of an electro-optical device 10 applied to the display system, and FIG. 3 is a diagram illustrating an electrical configuration of the electro-optical device 10.

As illustrated in FIG. 1, in the display system 1, a host device 4 and the electro-optical device 10 are coupled to each other through an FPC (Flexible Printed Circuits) substrate 194. The host device 4 supplies image data Din, a synchronization signal Sync and the like to the electro-optical device 10 through the FPC substrate 194.

Note that the first embodiment is an example in which the electro-optical device 10 is provided with a correction circuit 40.

The electro-optical device 10 is a micro display panel that displays an image in a head-mounted display or the like, for example. The electro-optical device 10 includes a plurality of sub-pixels, a driving circuit for driving the sub-pixels and the like. The sub-pixel and the driving circuit are integrated on a semiconductor substrate. The semiconductor substrate is typically a silicon substrate, but may be any other semiconductor substrates.

As illustrated in FIG. 2, the electro-optical device 10 is housed in a frame-shaped case 192 including an opening 191. One end of the FPC substrate 194 is coupled to the electro-optical device 10. A plurality of terminals 196 is provided at the other end of the FPC substrate 194. The plurality of terminals 196 is coupled to the host device 4.

FIG. 3 is a diagram illustrating an electrical configuration of the electro-optical device 10. The electro-optical device 10 is broadly divided into a control circuit 30, the correction circuit 40, a data signal output circuit 50, a display unit 100, and a scanning line driving circuit 120.

In the display unit 100, scanning lines 12 of m rows are provided along the lateral direction in the drawing, and data lines 14 of (3*n*) columns are provided along the vertical direction in such a manner that they maintain electrical isolation from each scanning line 12. Note that m and n are integers of 2 or more.

To distinguish the rows of the scanning lines 12, they may be referred to as 1, 2, . . . , (m−1), and m from top in the drawing. Note that to describe the scanning lines 12 in general without specifying the rows, it may be denoted as i-th row using an integer i, which is an integer from 1 to m.

In addition, to distinguish the columns of the data lines 14, they may be referred to as 1, 2, 3, . . . , (3*n*−2), (3*n*−1), and (3*n*) from left in the drawing. Note that the data lines 14 are grouped in units of three columns. When an integer j from 1 to n is used to describe the group in general, the data lines 14 of a total of three columns, the (3*j*−2)th column, the (3*j*−1)th column, and (3*j*)th column, belong to the j-th group from left.

Sub-pixels 11R, 11G, and 11B are provided corresponding to the scanning lines 12 arranged in m rows and the data lines 14 arranged in (3*n*) columns. More specifically, the sub-pixel 11R is provided corresponding to the intersection of the scanning line 12 of the i-th row and the data line 14 of the (3*j*−2)th column. The sub-pixel 11G is provided corresponding to the intersection of the scanning line 12 of the i-th row and the data line 14 of the (3*j*−1)th column. The sub-pixel 11B is provided corresponding to the intersection of the scanning line 12 of the i-th row and the data line 14 of the (3*j*)th column.

The sub-pixel 11R emits light of red component, the sub-pixel 11G emits light of green component, and the sub-pixel 11B emits light of blue component. One-color pixel is expressed by additive color mixing of light emitted from the sub-pixels 11R, 11B, and 11G. Note that the electrical configurations of the sub-pixels 11R, 11G, and 11B are the same. Therefore, sub-pixels are described with the reference numeral 11 when no particular distinction is necessary.

The synchronization signal Sync and the image data Din are supplied to the electro-optical device 10 from the host device 4 as described above. The synchronization signal Sync includes a vertical synchronization signal that indicates the start of vertical scanning of the image data Din, a horizontal synchronization signal that indicates the start of horizontal scanning, and a dot clock signal that indicates the timing for one pixel of image data. The image data Din specifies the tone at the sub-pixel to be displayed, in 8 bits for each of red, green, and blue, for example.

The control circuit 30 controls each unit based on the synchronization signal Sync. More specifically, the control circuit 30 generates various control signals for controlling each unit.

In this embodiment, the pixel to be displayed and one color pixel expressed with three sub-pixels in the display unit 100 correspond to each other in a one-to-one correspondence. The luminance characteristics in the tone indicated by the image data Din and the luminance characteristics of the OLED included in the sub-pixel 11 do not necessarily match. In view of this, in order to cause the OLED to emit light with the luminance corresponding to the tone indicated by the image data Din, the 8 bits of the image data Din are up-converted to 10 bits for each color in a LUT (Look Up Table) included in the correction circuit 40, and output as image data Dout, for example. By converting the image data Din to output the image data Dout, the correction circuit 40 corrects the colors of the color pixels displayed by three sub-pixels.

In the LUT, for each color, 10 bits of the image data Dout are stored for each tone from "0" to "255" in decimal notation of the image data Din. Further, in the LUT, the image data Dout corresponding to the tone of the image data Din is read, and output to the data signal output circuit 50.

Note that in the image data Dout of each tone, the red component may be referred to as the R value, the green component as G value, and the blue component as the B value.

In addition, the specific configuration in the correction circuit 40, and the R value, G value, and B value of the image data Dout to be stored in accordance with each tone of the image data Din are described later.

The scanning line driving circuit 120 is a circuit for driving for each row the sub-pixels 11 arranged in m rows and (3*n*) columns under the control of the control circuit 30. For example, the scanning line driving circuit 120 sequentially supplies scanning signals/Gwr(1), /Gwr(2), . . . , /Gwr(m−1), and /Gwr(m) to the scanning lines 12 of 1, 2, 3, . . . , (m−1), and m-th rows. In general, the scanning signal that is supplied to the scanning line 12 of the i-th row is denoted as/Gwr(i).

The data signal output circuit 50 is a circuit that outputs, through the data line 14, data signal to the sub-pixel 11 located at the row selected by the scanning line driving circuit 120 under the control of the control circuit 30. The data signal is a signal of a voltage converted to analog from the 10-bit image data Dout converted by the LUT of the correction circuit 40. Specifically, the data signal output circuit 50 converts to analog the image data Dout for one row corresponding to the sub-pixels 11 of the first to (3*n*)th columns in the selected row, and outputs it to the data lines 14 of the first to (3*n*)th columns in this order.

In the drawing, the data signal output to the data lines 14 of first, second, third, . . . , (3*n*−2)th, (3*n*−1)th, and (3*n*)th columns are denoted as Vd(1), Vd(2), Vd(3), . . . , Vd(3*n*−2), Vd(3*n*−1), and Vd(3*n*), respectively. In general, the data signal supplied to the data line 14 of the j-th column is denoted as Vd(j).

Figure 4:
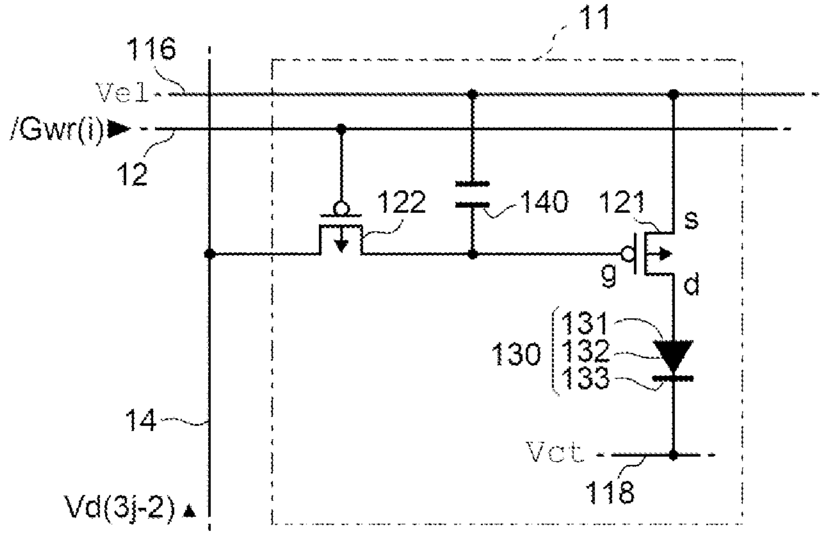
FIG. 4 is a diagram illustrating a configuration of a pixel circuit in the electro-optical device.

FIG. 4 is a circuit diagram illustrating an electrical configuration in the sub-pixel 11. As illustrated in the drawing, from the electrical viewpoint, the sub-pixel 11 includes P-channel MOS transistors 121 and 122, an OLED 130, and a capacitive element 140.

Note that the term "electrical viewpoint" in description of the sub-pixel 11 is used for describing a plurality of elements making up the sub-pixel 11 and the coupling relationship between the plurality of elements. Such a term is used because the sub-pixel 11 includes an element that does not contribute to the electrical coupling relationship from the mechanical or physical viewpoint.

The OLED 130 is an example of a light-emitting element, and sandwiches a light-emitting layer 132 with a pixel electrode 131 and a common electrode 133. The pixel electrode 131 functions as the anode, and the common electrode 133 functions as the cathode. In the OLED 130, when a current flows from the anode toward the cathode, the hole injected from the anode and the electron injected from the cathode recombine at the light-emitting layer 132 to generate excitons, and generate white (achromatic) light.

The generated white light is resonated at a light resonator composed of a reflective electrode and a semi-reflective semi-transmissive layer omitted in the drawing, and in the case of the sub-pixel 11R, the light is emitted at a resonance wavelength set for red. A coloring layer (color filter) for the red is provided on the light emission side from the light resonator. In this manner, the light emitted from the OLED 130 is visually recognized by the viewer through the light resonator and the coloring layer.

Note that in the case of the sub-pixel 11G, the light is emitted at a resonance wavelength set for green and visually recognized by the viewer through the coloring layer for green. In the case of the sub-pixel 11B, the light is emitted at a resonance wavelength set for blue and visually recognized by the viewer through the coloring layer for blue.

At the transistor 121 of the sub-pixel 11 at the i-th row (3*j*−2)th column, a gate node g is coupled to the drain node of the transistor 122, the source node is coupled to a power feed line 116 of a voltage Vel, and the drain node is coupled to the pixel electrode 131, which is the anode of the OLED 130.

At the transistor 122 of the sub-pixel 11 at the i-th row (3*j*−2)th column, the gate node is coupled to the scanning line 12 of the i-th row, and the source node is coupled to the data line 14 of the (3*j*−2)th column. The common electrode 133 that functions as the cathode of the OLED 130 is coupled to a power feed line 118 of a voltage Vct. In addition, since the electro-optical device 10 is formed at a silicon substrate, the substrate potential of the transistor 121 and 122 is set as a potential corresponding to the voltage Vel, for example.

Figure 5:
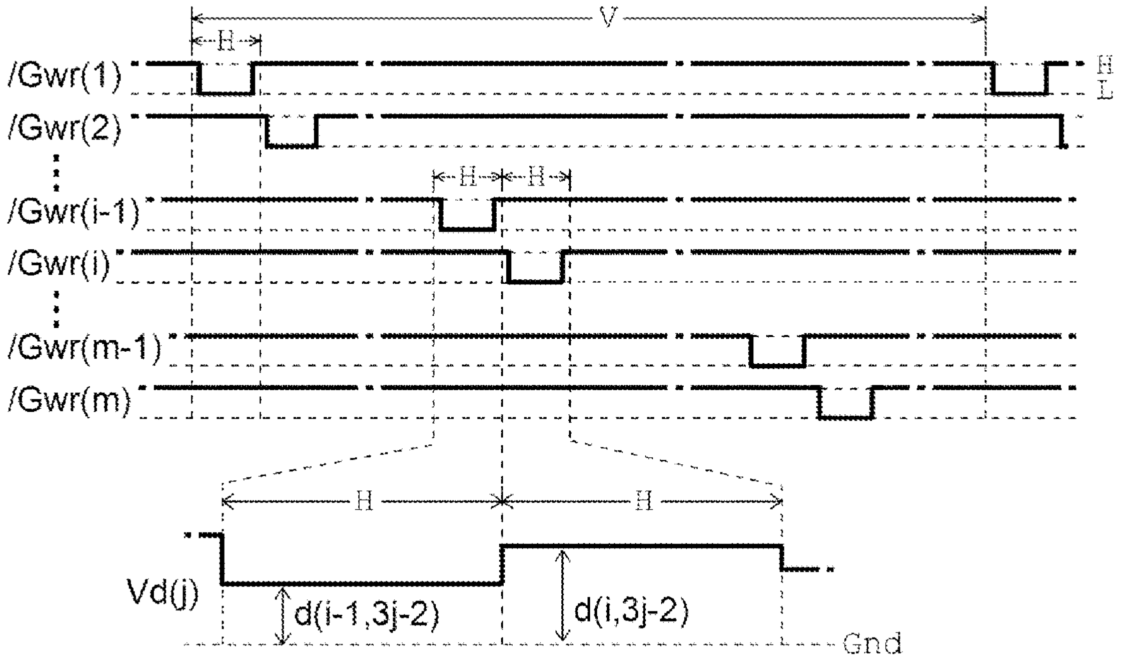
FIG. 5 is a diagram for describing an operation of the electro-optical device.

FIG. 5 is a timing diagram for describing an operation of the electro-optical device 10.

In the electro-optical device 10, the scanning lines 12 of m rows are scanned one by one in the order of first, second, third, . . . , and m-th rows in the period of a frame (V). Specifically, as illustrated in the drawing, scanning signals/Gwr(1), /Gwr(2), . . . , /Gwr(m−1), and/Gwr(m) are sequentially and exclusively set to L level every horizontal scanning period (H) by the scanning line driving circuit 120.

Note that in this embodiment, the period of the L level is separated in time between adjacent scanning signals among the scanning signals/Gwr(1) to/Gwr(m). More specifically, after the scanning signal/Gwr(i−1) is changed from the L level to H level, the next scanning signal/Gwr(i) is set to the L level after a period of time. This period corresponds to a horizontal blanking period.

In this description, the period of one frame (V) is a period required for displaying one frame of an image specified by image data Vid. The length of the period of one frame (V) is 16.7 milliseconds corresponding to one period of the vertical synchronization signal when it is the same as the vertical synchronization period, and, for example, the frequency of the vertical synchronization signal included in the synchronization signal Sync is 60 Hz. In addition, the horizontal scanning period (H) is the time period for sequentially setting the scanning signals/Gwr(1) to/Gwr(m) to the L level, and the start timing of the horizontal scanning period (H) is substantially at the center of the horizontal blanking period for convenience of illustration in the drawing.

When a certain scanning signal of the scanning signals/Gwr(1) to/Gwr(m), e.g., the scanning signal/Gwr(i) supplied to the scanning line 12 of the i-th row is set to the L level, the transistor 122 is set to on state at the sub-pixel 11 of the i-th row (3*j*−2)th column, in the case of the (3*j*−2)th column. As a result, the gate node g of the transistor 121 in the sub-pixel 11 is electrically coupled to the data line 14 of the (3*j*−2)th column.

Note that in this description, the "on state" of a transistor or a switch is a low impedance state where the part between the source and drain nodes in the transistor, or both ends of the switch are electrically closed. In addition, the "off state" of a transistor or a switch is a high impedance state where the part between the source and drain nodes in the transistor, or both ends of the switch are electrically open.

In addition, in this description, the term "electrically coupled", or simply "coupled" means a state where two or more elements are directly or indirectly connected, or coupled. The term "not electrically coupled" or simply "not coupled" means a state where two or more elements are not directly or indirectly connected, or coupled.

In the horizontal scanning period (H) where the scanning signal/Gwr(i) is set to the L level, the data signal output circuit 50 converts the R value, G value, and B value corresponding to the sub-pixels of i-th row 1st column to i-th row (3*n*)th column indicated by the image data Dout into analog data signals Vd(1) to Vd(n), and outputs them to the data lines 14 of the first to (3*n*)th columns. In the case of the (3*j*−2)th column, the data signal output circuit 50 converts d(i, 3*j*−2) of the R value corresponding to the sub-pixel 11R of the i-th row (3*j*−2)th column in the image data Dout into an analog data signal Vd(j), and outputs it to the data line 14 of the (3*j*−2)th column.

Note that in the horizontal scanning period (H) where the scanning signal/Gwr(i−1) one row before the scanning signal/Gwr(i) is set to the L level, the data signal output circuit 50 converts d(i−1, 3j−2) of the R value of the sub-pixel 11R of (i−1)th row (3*j*−2) the column into an analog data signal Vd(3*j*−2), and outputs it to the data line 14 of the (3*j*−2)th column.

The data signal Vd(3*j*−2) is supplied to the gate node g of the transistor 121 at the sub-pixel 11R of the i-th row (3*j*−2)th column through the data line 14 of the (3*j*−2)th column, and held by the capacitive element 140. Therefore, the transistor 121 passes a current corresponding to the voltage between the gate node and the source node through the OLED 130.

Even when the scanning signal Gwr(i) is set to the H level and the transistor 122 is set to the off state, the current continues to flow through the OLED 130 because the voltage of the data signal Vd(3j−2) is held by one end of the capacitive element 140. As a result, at the sub-pixel 11 of the i-th row (3j−2)th column, the OLED 130 continues to emit light at the voltage held by the capacitive element 140 i.e., at the brightness corresponding to the tone until the period of one frame (V) elapses and the transistor 122 is turned on again to apply the voltage of the data signal again.

Note that while the sub-pixel 11 of the i-th row (3j−2)th column is described above, the OLEDs 130 other than that of the i-th row (3j−2) column also emit light at the luminance indicated by the image data Dout.

In addition, the OLEDs 130 of the sub-pixels 11 other than that of the i-th row emit light at the luminance indicated by the image data Dout when the scanning signals/Gwr(1) to/Gwr(m) are sequentially set to the L level.

Thus, in the electro-optical device 10, in the period of one frame (V), each of the OLEDs 130 of all sub-pixels 11 from 1st row 1st column to m-th row (3n)th column emits light at the luminance indicated by the image data Dout, and as a result the image of one frame is displayed.

As described above, the OLED 130 itself emits white light, which is then subjected to the coloring at the light resonator and the coloring layer, and thus red at the sub-pixel 11R, green at the sub-pixel 11G, and blue at the sub-pixel 11B are visually recognized by the viewer.

Figure 6:
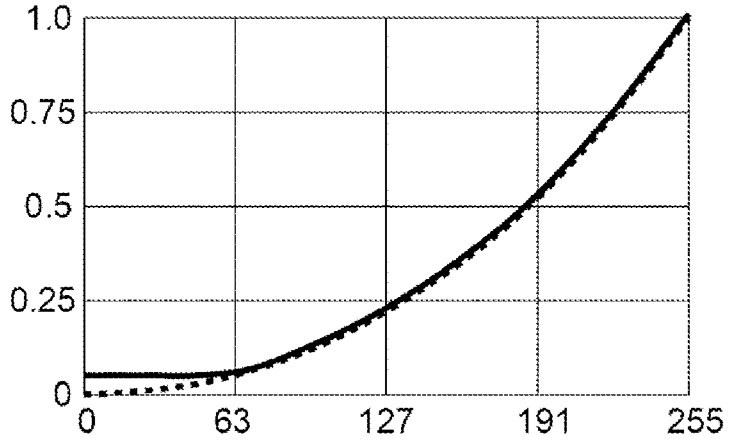
FIG. 6 is a diagram for describing abnormal light emission of the electro-optical device.

In addition, ideally, at the sub-pixel 11 of the electro-optical device 10, as the tone increases, the current flowing through the OLED 130 increases, and the luminance increases as indicated with the broken line in FIG. 6. In other words, as the tone decreases, the current flowing through the OLED 130 decreases, and further, when the minimum tone is “0”, no current flows the OLED 130, resulting in zero luminance.

However, when a self-luminous element such as the OLED 130 is used as an electro-optical element, abnormal luminescence may possibly occur due to leakage current in a low tone and the like. Abnormal luminescence is a phenomenon in which in a low tone, the OLED 130 emits light at a luminance higher than the luminance specified for that tone as indicated with the solid line in FIG. 6, for example.

In the related art, white point is set at a certain color temperature, e.g., 6800K regardless of the tone. The white point does not mean white as a color, but is the color temperature that should be displayed by the sub-pixels 11R, 11G, and 11B and their display states when the R value, G value, and B value of the image data Dout are the same value. Therefore, in terms of color, the white point includes gray and black, which are perceived by humans as achromatic colors, and the display state of the white point may be called white luminescence or white display.

When abnormal luminescence occurs in a particular color, e.g., red, the white point is shifted as the tone decreases, and depending on the degree of the shift it may be difficult to create image data Vout such that the white point has the same color temperature across all tones.

In addition, in some cases, such a color shift is largely varied among the electro-optical devices 10, and the color shift may not be corrected in some individuals among all of the electro-optical devices 10 in mass production.

Here, two reasons for the abnormal luminescence are briefly described.

The first reason is attributed to the layer making up the light-emitting layer 132. The OLED 130 has a configuration in which the light-emitting layer 132 is sandwiched between the pixel electrode 131 of the anode and the common electrode 133 of the cathode as described above, and further the light-emitting layer 132 is composed of a plurality of layers. More specifically, as viewed from the pixel electrode 131 of the anode, the light-emitting layer 132 is composed of a hole injection layer, a red emission layer, a blue emission layer, a green emission layer, and an electron injection layer, for example.

A case is described here in which the red emission layer is closest to the anode among the red emission layer, the blue emission layer, and the green emission layer in the light-emitting layer 132, but when the blue emission layer is closest thereto, a larger amount of blue component will be contained. There is a step at the sub-pixels 11R, 11G, and 11B due to the light resonator and the like. At the light-emitting layer 132, such a step results in poor throwing, and layers other than the hole injection layer tend to be thin. When the thickness of the hole injection layer relatively increases, the hole injectivity decreases, and the electron injectivity increases in terms of carrier mobility. When the electron injectivity increases, exciton recombination is more likely to occur on the anode side. As a result, the light emission intensity of the red emission layer on the anode side increases, a larger amount of the red component is contained.

The second reason is attributed to the step due to the light resonator. The distance between the common electrode 133 and the reflective electrode at the light resonator gradually increases in the order of the sub-pixels 11B, 11G, and 11R. As a result, at the periphery of the sub-pixel 11R, i.e., the portion adjacent to other sub-pixels 11G and 11B in the sub-pixel 11R, there is a portion where the light-emitting layer 132 between the pixel electrode 131 and the common electrode 133 is locally thinned due to the step. Current flows more easily at the portion where the light-emitting layer 132 is thinned. In the planar portion with no step, i.e., the portion to emit the red component in the sub-pixel 11R, current flows easily at the portion where the light-emitting layer 132 is thinned due to the step even with minute current that causes no light emission or only a slight light emission, and therefore light is emitted and visually recognized. If the light-emission wavelength meets the resonance condition of the light resonator in the sub-pixel 11R, it is easily visually recognized.

Figure 7:
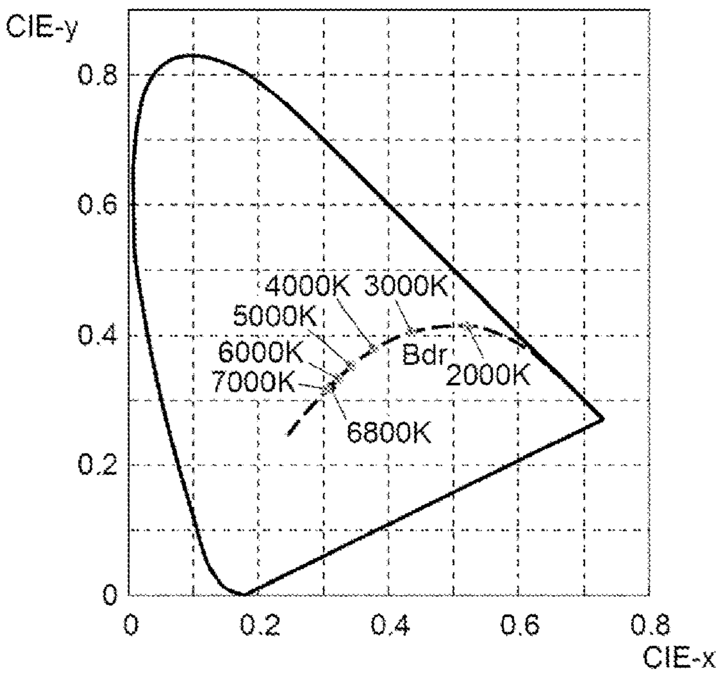
FIG. 7 is a diagram illustrating a CIE chromaticity diagram and a color temperature locus of black-body radiation.

In this embodiment, in accordance with the tone, the white point is set along a color temperature locus Bdr of black-body radiation in a chromaticity diagram CIE illustrated in FIG. 7. Note that the color temperature locus Bdr of black-body radiation is simply denoted as black-body locus Bdr. In general, the color on the black-body locus Bdr is easily recognized by humans as white, including achromatic colors, and therefore even if the coordinates of the white point in the high tone differ from the coordinates of the white point in the lower tone, it is less uncomfortable when the white point is on the black-body locus Bdr in the CIE chromaticity diagram. In view of this, the color shift can be made less noticeable even when abnormal luminescence is caused by creating the image data Dout by setting the point that is on the black-body locus Bdr and is the point of a reproducible color temperature as the white point such that it is perceived as white including achromatic colors in the low tone even in a low-tone state, i.e., in the state where the current flowing through the OLED 130 is small.

Note that when red abnormal luminescence occurs in the low tone region, the point is set such that as the tone decreases, it is separated in the direction of lower color temperature from the white reference color temperature along the black-body locus Bdr, i.e., the point of 6800K.

When the variation among individuals of the electro-optical devices 10 is large in the low-tone color gamut, a plurality of white point settings is required. In view of this, in this embodiment, in the inspection process after manufacturing of the electro-optical device 10, data for identifying the individual difference is acquired, and the correction circuit 40 determines the rank for setting the white point in accordance with the individual differences based on the data.

The determined rank is classified by the degree of the color gamut in the low tone, and is used for setting the white point matching the color gamut.

Figure 8:
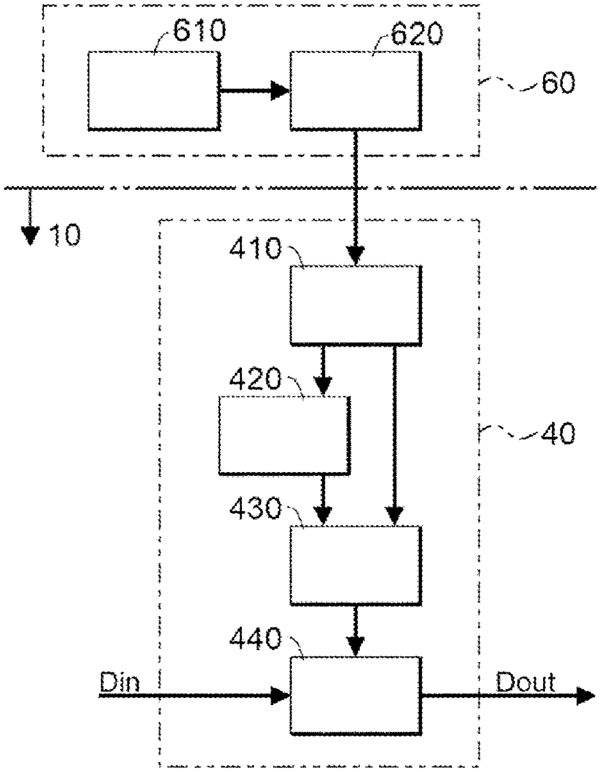
FIG. 8 is a block diagram illustrating a configuration in which an inspection device and an electro-optical device are coupled to each other in an inspection process.

FIG. 8 is a block diagram illustrating a relationship between the correction circuit 40 and functional blocks of an inspection device 60 used for an inspection process.

In the inspection process, the inspection device 60 is coupled to the correction circuit 40 of the electro-optical device 10. The inspection device 60 is a computer in which a center computation device such as a central processing unit (CPU) executes a program to control the measurement device, and a low-tone data acquiring unit 610 and a high-tone data acquiring unit 620 are configured through execution of the program.

In the inspection device 60, the low-tone data acquiring unit 610 causes the electro-optical device 10 subjected to creation of the image data Dout to emit light at a level corresponding to low tone, acquires data such as luminance, chromaticity, and current value at that light emission from the measurement device, and stores the data.

Note that the data such as the luminance, chromaticity, and current value measured at light emission in a low tone is used for the rank determination described later. In addition, the level corresponding to the low tone is a level with relatively low red, blue, and green tones, i.e., a dark level. For the above-described second reason, when red abnormal luminescence occurs at the periphery of the sub-pixel 11R, light may be emitted at a dark level in green or blue monochromatic color with which such an abnormal luminescence does not occur.

The high-tone data acquiring unit 620 acquires and stores 10 bits of the R value, G value, and B value in the image data Dout corresponding to the maximum tone "255" in red, green, and blue in the electro-optical device 10 subjected to creation. The image data Dout corresponding to the tone "255" is acquired in the following manner, for example. The inspection device 60 causes the electro-optical device 10 to emit light while changing red, green, and blue the image data Dout, and determines the combination of the R value, G value, and B value of the image data Dout that result in the designed chromaticity and luminance. Note that the designed chromaticity is the white point on the black-body locus Bdr at the color temperature of 6800K, i.e., chromaticity with an x value of 0.309 and a y value of 0.319 in the chromaticity diagram CIE, for example.

The correction circuit 40 includes a set value storage unit 410, the rank determination unit 420, a tone setting unit 430, and the LUT 440.

The set value storage unit 410 stores the measurement data acquired by the low-tone data acquiring unit 610, and the R value, G value, and B value of the image data Dout acquired by the high-tone data acquiring unit 620, which are transferred from the inspection device 60. That is, the set value storage unit 410 of the electro-optical device 10 stores data of the electro-optical device 10 measured by the inspection device 60 is stored.

From measurement data at the low-tone light emission stored in the set value storage unit 410 and the like, the rank determination unit 420 determines the type of the rank of the electro-optical device 10 as described later. Note that in this embodiment, there are three types ranks, namely, rank 1, rank 2, and rank 3.

For each rank, data of the color temperature and chromaticity (x value and y value) of the black-body locus Bdr set for white luminescence are associated with specific tones from "0" to"255", e.g., tones of "31", "47", "63", "127", and "255" as illustrated in FIG. 9, and stored in the rank determination unit 420.

Figure 10:
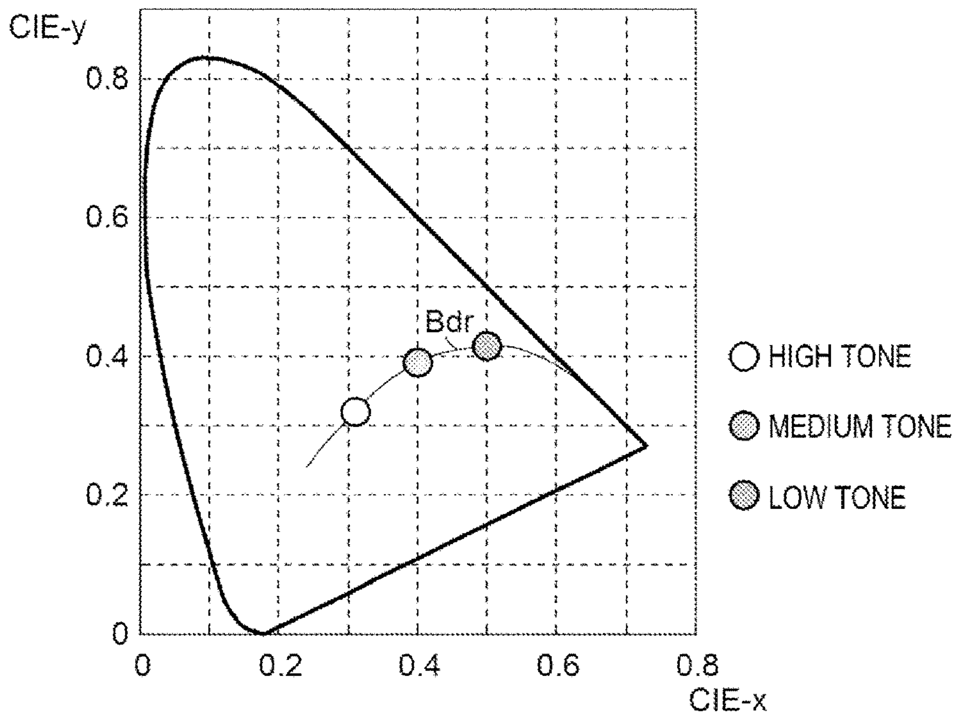
FIG. 10 is a diagram illustrating a shift of a color temperature at a white point of a rank 1.

Note that the rank 1 in FIG. 9 is the electro-optical device 10 in which the red component tends to increase as the tone decreases, and is set such that the color temperature of the white point decreases as the tone decreases. Note that in this example of the rank 1 includes three types of color temperature. In addition, here, the tone is used for white luminescence, and therefore the R value, G value, and B value are the same value. In the rank 1, the color temperature of the white point gradually decreases as it changes from high tone to medium tone and low tone in the CIE chromaticity diagram as illustrated in FIG. 10.

Figures 12, 13:
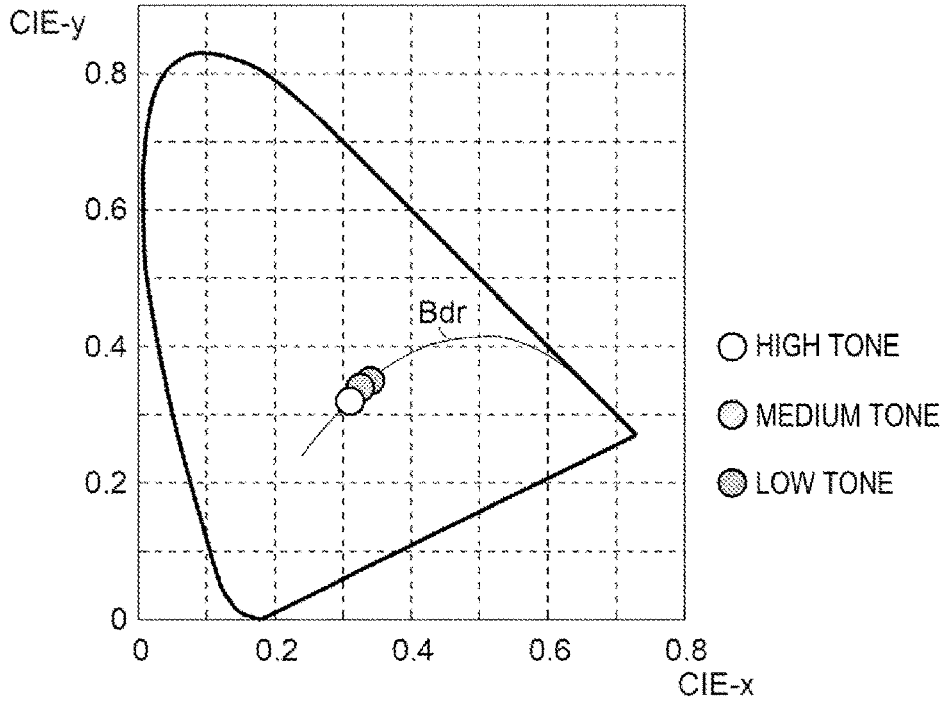
FIG. 12 is a diagram illustrating a shift of a color temperature at a white point of a rank 3.
FIG. 13 is a diagram illustrating an R value, G value, and B value of image data stored in a LUT.

The rank 3 in FIG. 9 is the electro-optical device 10 in which the red component tends to remain almost unchanged even when the tone decreases, and only one color temperature is used for setting the white point even when the tone decreases. Note that in the rank 3 the color temperature of the white point is constant even when it changes from high tone to medium tone and low tone in the CIE chromaticity diagram as illustrated in FIG. 12. Note that if the white dots overlap, they cannot be distinguished, and therefore in FIG. 12, they are shifted slightly for ease of viewing.

Figure 11:
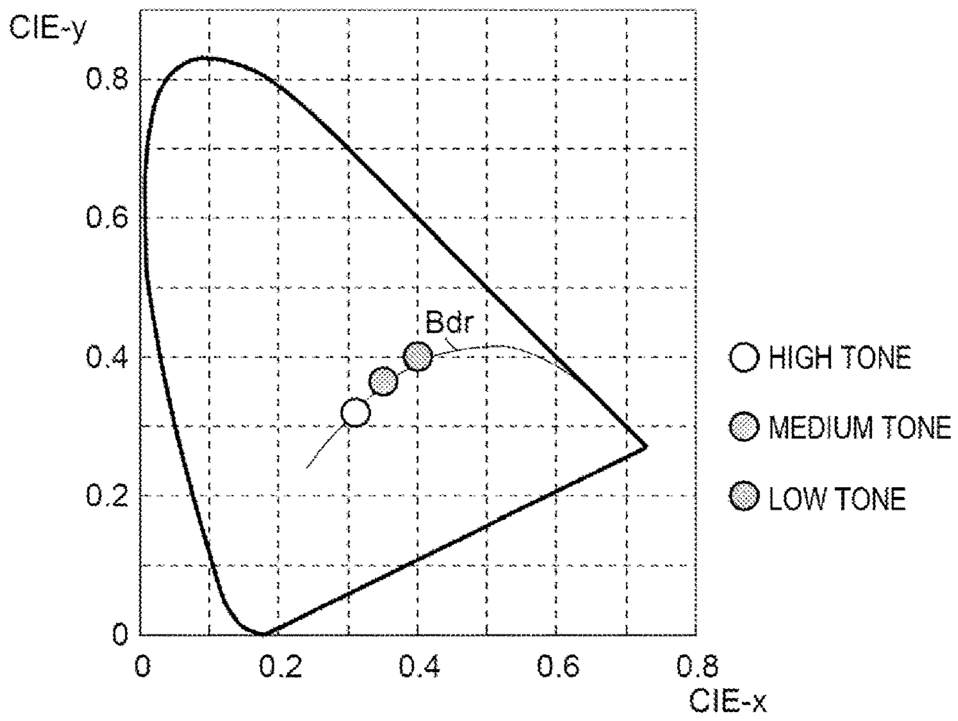
FIG. 11 is a diagram illustrating a shift of a color temperature at a white point of a rank 2.

The rank 2 in FIG. 9 is the electro-optical device 10 in which the red component for the lowered tones is set between the values of the rank 1 and the rank 2, and is the same as the rank 1 in that the color temperature of the white point is set to decrease as the tone decreases. It should be noted that in the rank 2, the number of the types of the color temperature of the white point is two, which is less than in the rank 1. In the rank 2, the variation of the color temperature of the white point when it changes from high tone to medium tone and low tone is smaller than that in the rank 1 in the CIE chromaticity diagram as illustrated in FIG. 11.

The rank 1 or the rank 2 is an example of a rank A with a plurality of color temperatures set for white luminescence in accordance with the tone. The rank 3 is an example of a rank B with only one color temperature set for white luminescence regardless of the tone.

When the rank determination unit 420 determines the type of rank in the electro-optical device 10, data of the color temperature and chromaticity of the specific tone corresponding to the type of rank is supplied to the tone setting unit 430. In this manner, the white point in the specific tone is set. First, the tone setting unit 430 calculates the R value, G value, and B value of the image data Dout corresponding to the specific tone by using data stored in the set value storage unit 410. Specifically, since measurement data in low tone light emission, and the R value, G value, and B value of the image data Dout corresponding to the tone of "255" are stored in the set value storage unit 410, the tone setting unit 430 calculates the R value, G value, and B value of the image data Dout corresponding to the specific tone.

Next, the tone setting unit 430 calculates the R value, G value, and B value of the image data Dout corresponding to the tone other than the specific tone by using the R value, G value, and B value of the image data Dout corresponding to the specific tone. Specifically, the tone setting unit 430 calculates the R value, G value, and B value of the image data Dout corresponding to the tone other than the specific tone through interpolation calculation with the R value, G value, and B value of the image data Dout corresponding to the specific tone.

In this manner, the tone setting unit 430 determines the R value, G value, and B value of the image data Dout for each of the tones from "0" to"255". Then, the tone setting unit 430 sets the R value, G value, and B value of the image data Dout corresponding to each of the tones from "0" to"255" in the LUT 440.

FIG. 13 is a diagram illustrating an example of the image data Dout stored in the LUT 440. In this example, when the rank of the electro-optical device 10 as the target is 1, the R value, G value, and B value of the image data Dout corresponding to "31", "47", "63", "127", and "255" of the specific tone are calculated, and then the R value, G value, and B value of the image data Dout corresponding to the tone other than the specific tone are calculated through interpolation calculation.

An example of rank determination at the rank determination unit 420 is described below. As illustrated in FIGS. 10 to 12, as the rank increases, the variation of the color temperature of the white point in the low tone decreases. This is used for the rank determination.

Figure 14:
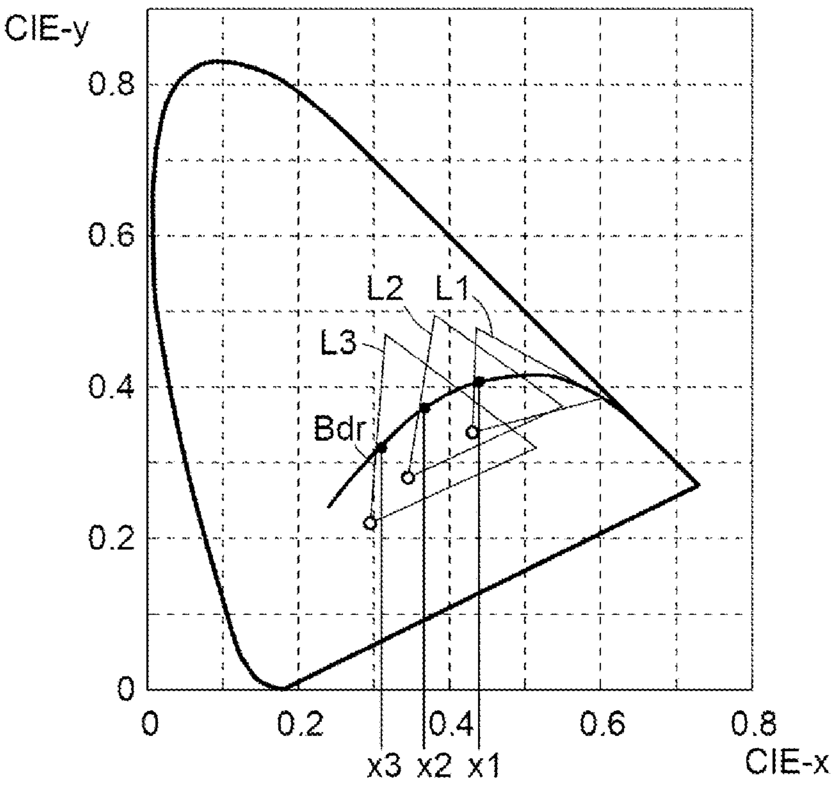
FIG. 14 is a diagram illustrating an exemplary determination of ranks.

FIG. 14 is a diagram for describing the rank determination. First, in the chromaticity diagram CIE, a color gamut L1 corresponding to the rank 1, a color gamut L2 corresponding to the rank 2, and the color gamut L3 corresponding to the rank 3 are set in advance. The color gamut L1, the color gamut L2, and the color gamut L3 are color gamut that can be expressed in a low tone by the electro-optical device 10, and are each indicated in a triangular shape.

To put it simply, when the electro-optical device 10 subjected to inspection is caused to emit only blue light in a low tone, and the X value of the chromaticity indicated with the white circle in the drawing is smaller than a threshold value x1 and equal to or greater than a threshold value x2, the rank determination unit 420 determines that the rank of the electro-optical device 10 is 1. The X value of the chromaticity obtained when blue light is emitted in a low tone is smaller than a threshold value x2 and equal to or greater than a threshold value x3, the rank determination unit 420 determines that the rank of the electro-optical device 10 subjected to inspection is 2, whereas when that X value is smaller than the threshold value x3, the rank determination unit 420 determines that the rank of the electro-optical device 10 subjected to inspection is 3. Note that the threshold value x1 is an x value with which the color temperature is lowest on the black-body locus Bdr in the color gamut L1. The threshold value x2 is an x value with which the color temperature is lowest on the black-body locus Bdr in the color gamut L2, and likewise, the threshold value x3 is an x value with which the color temperature on the black-body locus Bdr in color gamut L3 is lowest.

According to the first embodiment, the color temperature of the white point is set to be shifted in accordance with the tone along the black-body locus Bdr. In this manner, even when red abnormal luminescence occurs in a low tone and the degree of the abnormal luminescence largely varies among the electro-optical devices 10, color shift due to such an abnormal luminescence can be made less noticeable.

While the color temperature of the white point tends to decrease as the tone decreases in the electro-optical device 10 in the first embodiment, the abnormal luminescence does not occur only for red as described above. More specifically, when the blue emission layer is closest to the anode among the red emission layer, the blue emission layer, and the green emission layer in the light-emitting layer 132, blue abnormal luminescence may possibly occur. When blue abnormal luminescence occurs in the electro-optical device 10, the color temperature of the white point increases as the tone decreases.

In view of this, a second embodiment that handles color shift of the electro-optical device 10 in which the color temperature of the white point increases as tone decreases is described below.

FIG. 15 is a diagram illustrating data of color temperature and chromaticity on the black-body locus Bdr associated with specific tones in the rank 1, the rank 2, and the rank 3 determined by the rank determination unit 420 in the second embodiment.

Note that the rank 1 in FIG. 15 is applied to the electro-optical device 10 in which the blue component increases as the tone decreases.

The rank 3 is applied to the electro-optical device 10 in which the blue component remains almost unchanged even when the tone decreases.

The rank 2 is applied to the electro-optical device 10 in which the blue component when the tone decreases is set to values between the rank 1 and the rank 2.

The rank of the electro-optical device 10 in which the color temperature of the white point increases as the tone decreases may be determined by measuring the chromaticity when the electro-optical device 10 as the target is caused to emit only red in a low tone, i.e., only the color that does not cause abnormal luminescence, and determining the range where the x value of the chromaticity belongs among the ranges indicated by the above-mentioned threshold values x1, x2, and x3 illustrated in FIG. 14.

According to the second embodiment, even when blue abnormal luminescence occurs in the low tone and the degree of the abnormal luminescence largely varies among the electro-optical devices 10, color shift due to such an abnormal luminescence can be made less noticeable.

In the above-described first embodiment and second embodiment (hereinafter referred to as "embodiment and the like"), various variations or applications are possible as follows.

While the white point of each tone is a point on the black-body locus Bdr in the chromaticity diagram CIE in the embodiment and the like, it need not necessarily be on the black-body locus Bdr.

It is said that in general, when certain two colors are compared with each other, and the distance (Au'v') on the color space is greater than 0.02, humans can perceive the difference between the two colors. In other words, when certain two colors are compared with each other and the distance (Au'v') on the color space is equal to or smaller than 0.02, humans cannot perceive the difference between the two colors. Note that the distance (Au'v') is also called color difference.

Figure 16:
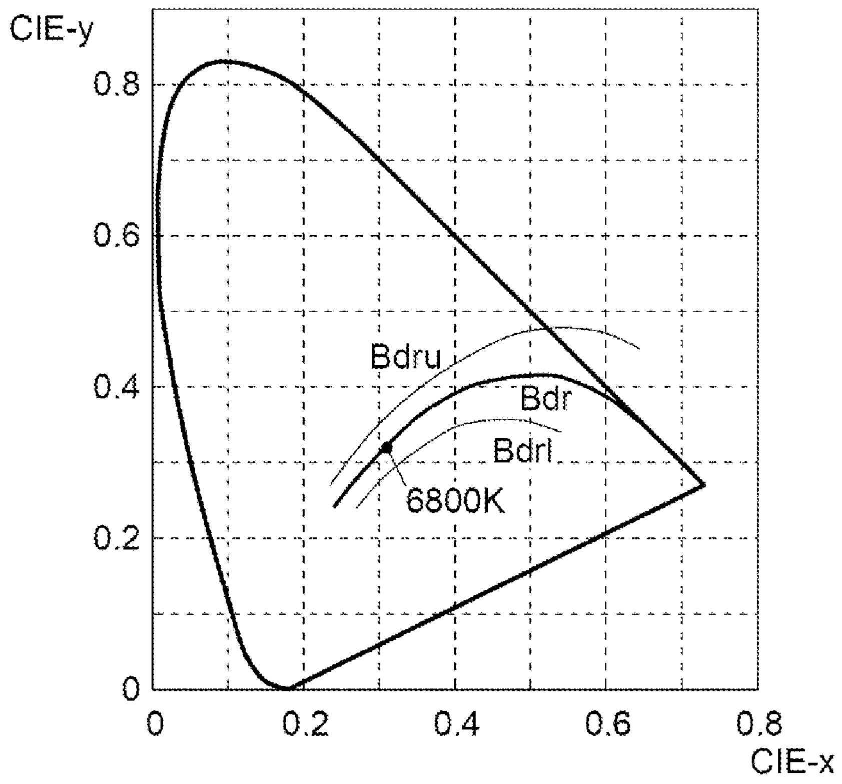
FIG. 16 is a block diagram illustrating a configuration of a display system according to a modification.

In view of this, when setting different color temperatures of the white point for respective tones, it suffices to set points with a color difference (Au'v') of 0.02 or smaller from the black-body locus Bdr. The color difference (Au'v') of 0.02 or smaller from the black-body locus Bdr is a range from a locus Bdru in the plus direction to a locus Bdrl in the minus direction with the black-body locus Bdr at the center in FIG. 16.

While three types of ranks are provided in the embodiment, it suffices that at least two types of ranks are provided. The larger the number of ranks, the electro-optical device 10 with more different tendencies can be handled; however, the determination of the rank is complicated, and the number of data items to be prepared increases.

Figure 17:
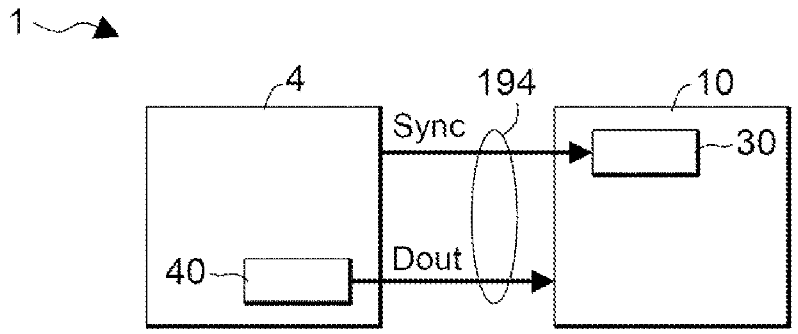
FIG. 17 is a diagram illustrating a color temperature locus of black-body radiation applied to a display system according to a modification.

While the correction circuit 40 is provided in the electro-optical device 10 in the embodiment and the like, the correction circuit 40 may be provided in the host device 4 as illustrated in FIG. 17, for example. In the case of the configuration in which the correction circuit 40 is provided in the host device 4, the LUT 440 in the correction circuit 40 converts the image data Din into the image data Dout, and the electro-optical device 10 displays an image based on the image data Dout.

In the case of the configuration in which the correction circuit 40 is provided in the host device 4, it is assumed that the host device 4 and the electro-optical device 10 are used as a pair. Examples of such an assumption include the head-mounted display described next.

In addition, in the case of the configuration in which the correction circuit 40 is provided in the host device 4, the inspection device 60 is coupled to the paired host device 4 the inspection process, and thus the R value, G value, and B value of the image data Dout are stored in the LUT 440 for each tone in the same manner as the embodiment and the like.

Next, an electronic device to which the display system 1 according to the embodiment and the like is applied is described. The electro-optical device 10 is suitable for a high-definition display with small pixel size. In view of this, as the electronic device, a head-mounted display is described below as an example.

Figure 18:
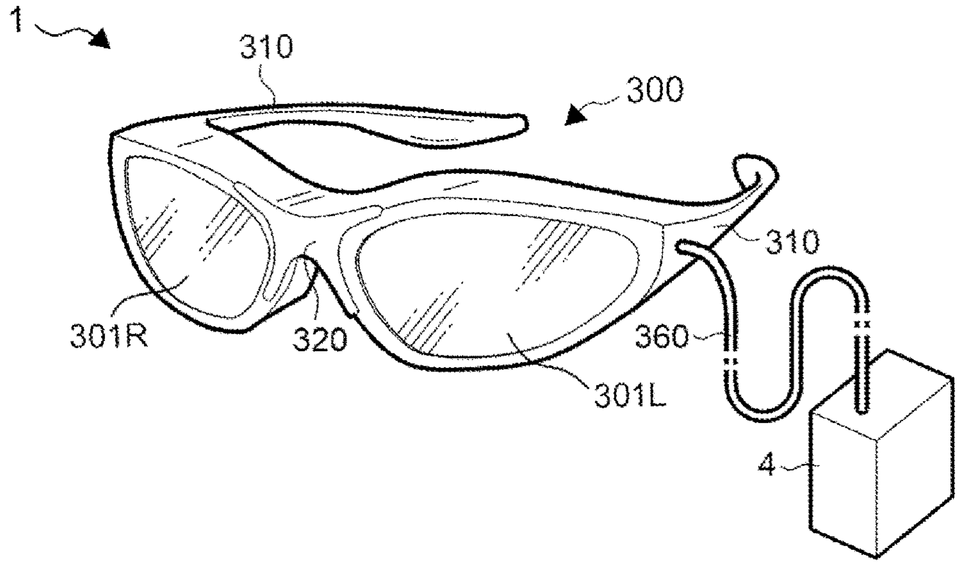
FIG. 18 is a diagram illustrating a headset in a display system 1.
Figure 19:
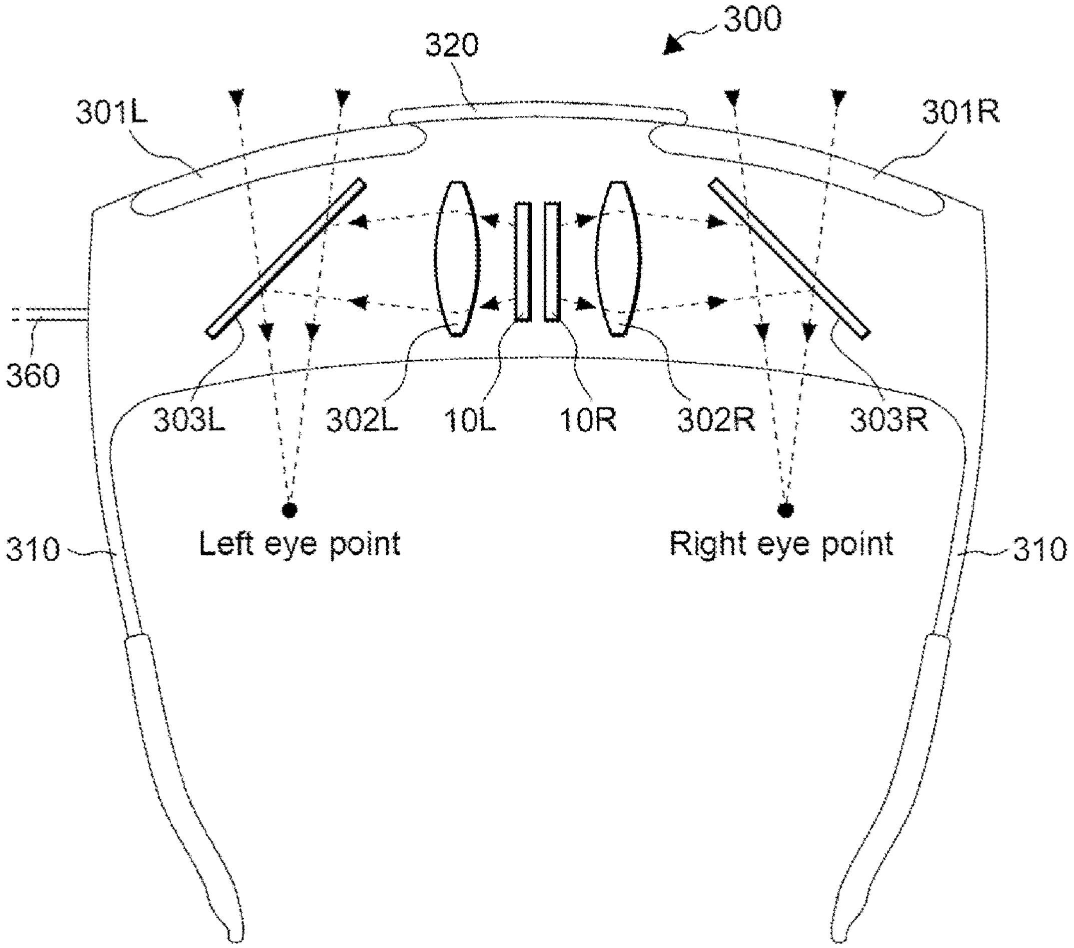
FIG. 19 is a diagram illustrating an optical configuration of the headset.

FIG. 18 is a diagram illustrating an external appearance of the display system 1 applied to a head-mounted display, and FIG. 19 is a diagram illustrating an optical configuration of a headset of the head-mounted display.

In an external appearance, a headset 300 includes a temple 310, a bridge 320, and lenses 301L and 301R as with a generally used eyeglasses. In addition, as illustrated in FIG. 19, the headset 300 is provided with an electro-optical device 10L for left eye and an electro-optical device 10R for right eye near the bridge 320 and on the depth side (in the drawing, lower side) of the lenses 301L and 301R.

Note that in this example, the host device 4 and the electro-optical devices 10L and 10R are coupled to each other through a cable 360, not through an FPC substrate 174 illustrated in FIGS. 1 and 17. In addition, in this example, the host device 4 serves also as a controller of the head-mounted display.

The image display surface of the electro-optical device 10L is located on the left side in FIG. 19. In this manner, the display image of the electro-optical device 10L is emitted in the direction of 9 o'clock in the drawing through an optical lens 302L. A half mirror 303L reflects the display image of the electro-optical device 10L in the direction of 6 o'clock, while transmitting incident light from the direction of 12 o'clock. The image display surface of the electro-optical device 10R is located on the right side opposite to the electro-optical device 10L. In this manner, the display image of the electro-optical device 10R is emitted in the direction of 3 o'clock in the drawing through optical lens 302R. A half mirror 303R reflects the display image of the electro-optical device 10R in the direction of 6 o'clock, while transmitting incident light from the direction of 12 o'clock.

With this configuration, the wearer of the headset 300 can view the display image of the electro-optical devices 10L and 10R superimposed on the outside scenery in a see-through manner.

In addition, when the images for left eye and right eye of the images for both eyes with parallax are displayed by the electro-optical devices 10L and the electro-optical device 10R, respectively, in the headset 300, the wearer can perceive the displayed images as if the images have depth and three-dimensionality.

The host device 4 may include the correction circuit 40 of the electro-optical device 10L and the correction circuit 40 of the electro-optical device 10R, the electro-optical device 10L may include the correction circuit 40, and the electro-optical device 10R may include the correction circuit 40.

In addition, in the correction circuit 40, the components other than the LUT 440 may be included in the inspection device 60.

Note that regarding the electronic device to which the display system 1 is applied, electronic viewfinders in video camcorders, digital camera with interchangeable lenses and the like, mobile information terminals, display units of wristwatches, light valves of projection type projectors and the like may also be applicable as well as head-mounted displays.

From the above description, suitable aspects of the present disclosure can be understood, for example, as follows. In order to facilitate the understanding of each aspect, the symbols of the drawings are shown below in parentheses for convenience, but this is not intended to limit the present disclosure to the illustrations.

A display system (1) according to one aspect includes a display unit (100) including a plurality of sub-pixels (11R, 11G, 11B) and configured to display a color in a tone set for each of the plurality of sub-pixels (11R, 11G, 11B), and a correction circuit (40) configured to correct the color displayed by the plurality of sub-pixels (11R, 11G, 11B) in accordance with the tone set for each of the plurality of sub-pixels (11R, 11G, 11B). When chromaticity of the color is equal to or greater than a predetermined threshold value, the correction circuit (40) corrects the color with a first color temperature as a white point, the first color temperature being a color temperature of a case where all of the plurality of sub-pixels (11R, 11G, 11B) display white in a predetermined first tone, and when the chromaticity of the color is smaller than the predetermined threshold value, the correction circuit (40) corrects the color with a second color temperature different from the first color temperature as the white point, the second color temperature being a color temperature of a case where all of the plurality of sub-pixels (11R, 11G, 11B) display white in a predetermined second tone, the predetermined second tone being lower than the predetermined first tone.

In the display system (1) according to aspect 2 of aspect 1, the first color temperature and the second color temperature correspond to a color temperature locus of black-body radiation.

Note that more specifically, the color temperature is not limited to points along the color temperature locus of black-body radiation, and points deviated from the color temperature locus of black-body radiation may be adopted as long as humans can perceive the color differences.

In the display system (1) according to aspect 3 of aspect 2, the first color temperature is higher than the second color temperature. In the display system (1) according to aspect 4 of aspect 2, the first color temperature is lower than the second color temperature.

In the display system (1) according to aspect 5 of aspect 1, the correction circuit (40) includes a tone setting unit (430), and the tone setting unit (430) sets the first color temperature and the second color temperature.

In the display system (1) according to aspect 6 of aspect 5, the correction circuit (40) includes a rank determination unit (420), the rank determination unit (420) determines whether a rank is at least a rank A or a rank B in accordance with a color gamut of a low tone equal to or smaller than the predetermined threshold value of the color, when the rank determination unit (420) determines that the rank is the rank A, the tone setting unit (430) sets, in accordance with the predetermined tones different from each other, a plurality of color temperatures set at a time of the white display, and when the rank determination unit (420) determines that the rank is the rank B, the tone setting unit (430) sets one color temperature set at the time of the white display.

What is claimed is:

1. A display system comprising:

a display unit including a plurality of sub-pixels and configured to display a color in a tone set for each of the plurality of sub-pixels; and a correction circuit configured to correct the color displayed by the plurality of sub-pixels in accordance with the tone set for each of the plurality of sub-pixels, wherein the correction circuit is further configured to compare chromaticity of the color to a predetermined threshold value, when the chromaticity of the color is equal to or greater than the predetermined threshold value, the correction circuit corrects the color with a first color temperature as a white point, the first color temperature being a color temperature of a case where all of the plurality of sub-pixels display white in a predetermined first tone and when the chromaticity of the color is smaller than the predetermined threshold value, the correction circuit corrects the color with a second color temperature different from the first color temperature as the white point, the second color temperature being a color temperature of a case where all of the plurality of sub-pixels display white in a predetermined second tone, the predetermined second tone being lower than the predetermined first tone.

2. The display system according to claim 1, wherein the first color temperature and the second color temperature correspond to a color temperature locus of black-body radiation.

3. The display system according to claim 2, wherein the first color temperature is higher than the second color temperature.

4. The display system according to claim 2, wherein the first color temperature is lower than the second color temperature.

5. The display system according to claim 1, wherein the correction circuit includes a tone setting unit and the tone setting unit sets the first color temperature and the second color temperature.

6. The display system according to claim 5, wherein the correction circuit includes a rank determination unit, the rank determination unit determines whether a rank is at least a rank A or a rank B in accordance with a color gamut of a low tone equal to or smaller than the predetermined threshold value of the color, when the rank determination unit determines that the rank is the rank A, the tone setting unit sets, in accordance with the predetermined tones different from each other, a plurality of color temperatures set at a time of the white display, and when the rank determination unit determines that the rank is the rank B, the tone setting unit sets one color temperature set at the time of the white display.

7. A display system comprising:

a display unit including a plurality of sub-pixels and configured to display a color in a tone set for each of the plurality of sub-pixels; and a correction circuit configured to correct the color displayed by the plurality of sub-pixels in accordance with the tone set for each of the plurality of sub-pixels, wherein when chromaticity of the color is equal to or greater than a predetermined threshold value, the correction circuit corrects the color with a first color temperature as a white point, the first color temperature being a color temperature of a case where all of the plurality of sub-pixels display white in a predetermined first tone and when the chromaticity of the color is smaller than the predetermined threshold value, the correction circuit corrects the color with a second color temperature different from the first color temperature as the white point, the second color temperature being a color temperature of a case where all of the plurality of sub-pixels display white in a predetermined second tone, the predetermined second tone being lower than the predetermined first tone, wherein the correction circuit includes a rank determination unit, the rank determination unit determines whether a rank is at least a rank A or a rank B in accordance with a color gamut of a low tone equal to or smaller than the predetermined threshold value of the color.

* * * * *